(12) United States Patent
Barker et al.

(10) Patent No.: US 7,837,813 B1
(45) Date of Patent: Nov. 23, 2010

(54) STIMULATED EMISSION RELEASE OF CHEMICAL ENERGY STORED IN STONE-WALES DEFECT PAIRS IN CARBON NANOSTRUCTURES

(75) Inventors: Delmar L. Barker, Tucson, AZ (US); William R. Owens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/473,274

(22) Filed: May 28, 2009

(51) Int. Cl.
C06B 45/00 (2006.01)
C06B 45/04 (2006.01)
D03D 23/00 (2006.01)
D03D 43/00 (2006.01)

(52) U.S. Cl. .................. 149/109.4; 149/2; 149/17; 149/108.2; 149/108.6

(58) Field of Classification Search ............. 149/109.4, 149/2, 17, 108.2, 108.6
See application file for complete search history.

(56) References Cited

U.S. PATENT DOCUMENTS
2006/0049033 A1* 3/2006 Miyamoto ............. 204/157.15

OTHER PUBLICATIONS

F. Beuneu "Nucleation and growth of single wall carbon nanotubes" Cond. Mat. Mtrl. Sci Sep. 15, 2005.

Felip Valencia "Large-amplitude coherent phonons and inverse Stone-Wales transitions in graphitic systems with defects interacting with ultrashort laser pulses" Physical review B 74, 075409 2006.

C. Shet. "Defect annihilations in carbon nanotubes under thermo-mechanical loading" Journal of Materials Science 40 (2005) 27-36.

Hua-Tong Yang "Antiresonance effect due to Stone-Wales defect in carbon nanotubes" Physics Letters A 325 (2004 287-293.

Ana Carpio "Dislocations in graphene" Cond. Mat. Mes-hal. Jun. 18, 2008.

C.P. Ewels "Metastable Frenkel Pair Defect in Graphite: Source of Wlgner Energy?" Physical Review Letters vol. 91, No. 2 Jul. 11, 2003.

Elena Margine "Theory of genus reduction in alkali-induced graphitization of nanoporous carbon" Physical Review B 76, 115436 (2007).

* cited by examiner

*Primary Examiner*—Jerry Lorengo
*Assistant Examiner*—James E McDonough
(74) *Attorney, Agent, or Firm*—Eric A. Gifford

(57) ABSTRACT

Stone Wales defect pairs in a carbon nanostructure are used to store energy. Energy is released by a chain reaction of phonons disrupting the defect pairs to generate more phonons until the lattice returns to its original hexagonal form and the energy is released in the form of lattice vibrations. Devices may be configured as a battery to release electrical energy in a controlled manner or as an explosive to release energy in an uncontrolled manner.

24 Claims, 7 Drawing Sheets

STIMULATED EMISSION RELEASE OF CHEMICAL ENERGY STORED IN STONE-WALES DEFECT PAIRS IN CARBON NANOSTRUCTURES

BACKGROUND OF THE INVENTION

1. Field of the Invention

This invention relates to chemical energy storage devices such as batteries or explosives.

2. Description of the Related Art

Higher density chemical energy storage devices present an ongoing technological challenge. Chemical energy is the energy that's stored in the bonds and between atoms that make up molecules.

Batteries store chemical energy in cells. The energy is converted by allowing two different chemical compounds in different cells to slowly interact thereby producing a controlled release of electrical energy. Normal chemical batteries start to degrade at temperatures of about 55 C and more rapidly at about 100 C because the chemical reaction barrier between the two chemical components breaks down and direct path leakage current flows and drains the battery of all the stored chemical potential energy. Battery technology and particularly high-temperature battery technology is a critical component to reducing the use and dependence on fossil fuels.

An explosive material may be a single unstable chemical compound or mixture of two or more stable chemical compounds, which upon the application of heat or shock, decomposes or rearranges the molecules to produce a violent detonation producing a shockwave. The release of energy is generally too fast for controlled electrical energy production. Explosives tend to become unstable at elevated temperatures. For example, TNT may detonate around temperatures of 250 C. Higher density stable explosives have applicability in both defense and commercial applications.

The efforts to improve existing battery and explosive technologies and to develop alternative technologies that hold the promise for higher density storage are ongoing. Such efforts must also address the stability, shelf life and environmental impact of the technologies.

SUMMARY OF THE INVENTION

The present invention provides a chemical energy storage device and means for releasing the energy. The device is capable of storing and releasing energy densities comparable to conventional explosives, exhibits high temperature stability, long shelf life and is environmentally friendly. The device may release the stored energy fast (explosive) or slow (battery) based on the same storage mechanism.

This is accomplished by manufacturing carbon nanostructures such as carbon nanotubes (CNTs) or graphene sheets with a high density of Stone-Wales defect pairs. Stone-Wales defect pairs store chemical energy and are stable in the carbon lattice at and well above typical operating temperatures. The manufactured densities of Stone-Wales defect pairs may exceed 25% and may preferably exceed 75%. The high concentration of Stone-Wales defect pairs creates an excited medium inside a nano cavity formed on the surface of the nanostructure. Stimulation means (e.g. laser pulse, heat or stretching) stimulate enough Stone-Wales defect pairs to overcome cavity losses to produce stimulated coherent emissions. As each defect pair is annihilated, it generates two opposite traveling phonons (lattice vibrations) thereby releasing the stored chemical energy as heat. The traveling phonons in turn annihilate other defect pairs producing a chain reaction. In a first mode a mass of carbon nanostructures are configured as an explosive material in which the chain reaction builds up rapidly in a resonant cavity to produce a violent shockwave. In a second mode a mass of carbon nanostructures are configured as a battery in which a reflector and an absorber are positioned at opposite ends of the cavity to produce a large temperature differential. This temperature differential is converted to electrical energy. A battery may include multiple independent carbon nanostructure "cells" to generate electrical energy.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
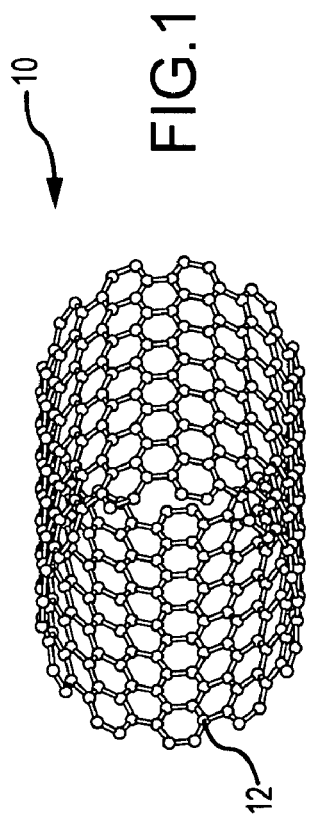
FIG. 1 is a diagram of a carbon nanotube (CNT)

The present invention provides a nano-scale device capable of storing and releasing energy densities comparable to conventional explosives, exhibits high temperature stability, long shelf life and is environmentally friendly. The device may release the stored energy fast (explosive) or slow (battery) based on the same storage mechanism.

Carbon Nanostructures

Carbon nanostructures have stimulated a great deal of interest in the materials, microelectronic and other industries because of their unique properties including tensile strengths above 35 GPA, elastic modulus reaching 1 TPa, higher thermal conductivity than diamond, ability to carry 1000× the current of copper, densities below 1.3 g/cm$^3$ and high chemical, thermal and radiation stability. CNTs have great promise for composite and fiber materials and devices such as field effect transistors, field emission displays, single electron transistors in the microelectronic industry, and uses in other industries. Commercialization of CNTs will depend in large part on the ability to grow and network CNTs on a large cost-effective scale without compromising these properties.

As used herein, "nanostructures" are carbon-based materials that have at least one dimension in the nanometer scale (i.e. less than 1 micrometer). All three dimensions may be less than 1 micrometer. Most nanostructures are electrically conductive although they may be insulating or semiconducting. This definition of nanostructures encompasses carbon nanotubes (CNTs), graphene sheets and fullerenes. Fullerenes are spheroidal, closed-cage molecules consisting essentially of sp²-hybridized carbons typically arranged in hexagons and pentagons. Fullerenes, such as $C_{60}$, also known as Buckminsterfullerenes, more commonly, "buckyballs," and $C_{70}$, have been produced from vaporized carbon at high temperature. A CNT 10 is a hollow cylindrical shaped carbon molecule. The cylinderical structure is built from a hexagonal lattice of $sp^2$ bonded carbon atoms 12 with no dangling bonds. The properties of single-walled nanotubes (SWNTs) are determined by the graphene structure in which the carbon atoms are arranged to form the cylinder. Multi-walled nanotubes (MWNTs) are made of concentric cylinders around a common central hollow.

The nanostructures may be prepared by any known method, and some are commercially available. A wide variety of methods have been devised for producing CNTs since the early disclosures by Iijima et al., including "Helical microtubules of graphitic carbon", NATURE, 354, 56 (1991) and "Single-shell carbon nanotubes of 1-nm diameter". NATURE, 363, 605-606 (1993). For example, a number of methods are mentioned in U.S. Pat. No. 7,052,668, the disclosure of which relating to preparation of SWCNTs is incorporated herein by reference. SWCNTs are commercially available presently in small commercial quantities. Various methods are known for synthesis of carbon nanotubes, and presently there are three main approaches. These include the laser ablation of carbon (Thess. A. et al., SCIENCE 273, 483 (1996)), the electric arc discharge of graphite rod (Journet, C. et al., NATURE 388, 756 (1997)), and the chemical vapor deposition of hydrocarbons (Ivanov, V. et al., CHEM. PHYS. LETT. 223, 329 (1994); Li A. et al., SCIENCE 274, 1701 (1996)). The production of multi-walled carbon nanotubes by catalytic hydrocarbon cracking is conducted on a commercial scale (U.S. Pat. No. 5,578,543), while the production of single-walled carbon nanotubes was still in a gram scale (as of 1998) by laser (Rinzler, A. G. et al., APPL. PHYS. A. 67, 29 (1998)) and arc (Haffner, J. H. et al., CHEM. PHYS. LETT. 296, 195 (1998)) techniques.

Figure 3A:
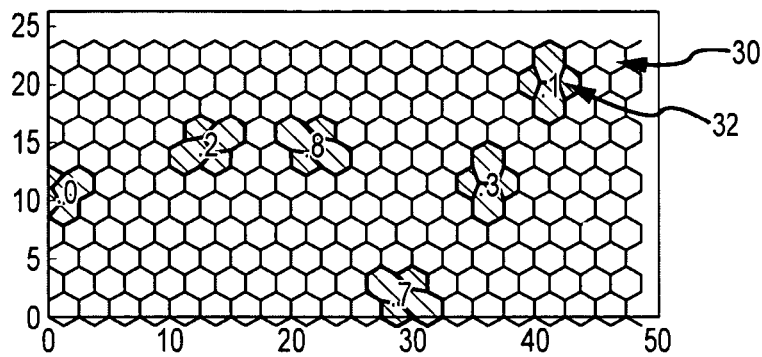
FIGS. 3a and 3b are diagrams of a graphene sheet with SW defects and the corresponding single-walled nanotube (SWNT)
Figure 3B:
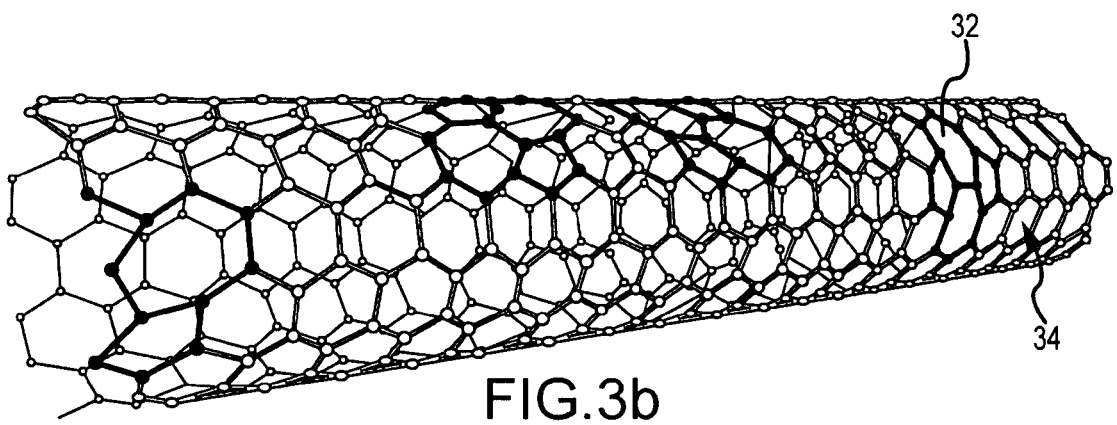

The manufacture of carbon nanostructures will yield a certain number of "defects" in the hexagonal carbon lattice. The manufacturing process is controlled to minimize the number of defects but some always remain. A "Stone-Wales" defect is the simplest possible point defect, which consists in a 90 degree rotation of a pair 20 of C atoms, with some rearrangement of the C—C bonds. The net result is the transformation of four hexagons 22 into two heptagons 24 and two pentagons 26 to form a "Stone-Wales defect pair" 28 (shown as a simplified iconic representation). A graphene sheet 30 having six SW defect pairs 32 and its corresponding CNT are shown in FIGS. 3a and 3b. The SW defect pairs lie within the 2-D cylindrical surface cavity of the CNT, one atom layer thick. For known manufacturing processes the maximum density of SW defects is approximately 5% e.g. at most 5% of the total carbon atoms reside in a SW defect pair.

The deleterious effects of SW defects in nanostructures is well known (see (I) Felip Valencia "Large-amplitude coherent phonons and inverse Stone-Wales transitions in graphitic systems with defects interacting with ultrashort laser pulses" Physical review B 74, 075409 (2006), (2) F. Beuneu "Nucleation and growth of single wall carbon nanotubes" Cond. Mat. Mtrl. Sci. 15 Sep. 2005, (3) C. Shet "Defect annihilations in carbon nanotubes under thermo-mechanical loading" Journal of Materials Science 40 (2005) 27-36 and (4) Hua-Tong Yang "Antiresonance effect due to Stone-Wales defect in carbon nanotubes" Physics Letters A 325 (2004)287-293). SW defects can weaken the mechanical properties of materials such as composites and fibers. SW defects cause electron scattering and degrade other electrical properties of electronic devices. SW defects may make it easier for contaminate atoms such as oxygen to attach to the carbon when exposed to air which may inhibit functionalization. SW defects are stable at and well above normal operating temperatures but may be removed by thereto-mechanical loading (see Shet) or laser irradiation (see Valencia). A more pristine carbon nanostructure will exhibit better mechanical and electrical properties.

Energy Storage Device

The present invention turns a defect to advantage by the realization that each Stone-Wales defect pair is a stable energy storage mechanism albeit only approximately 10 eV per pair. Annihilation of each defect pair releases two phonons of 5 eV each and returns the 5:7:5:7 structures in a local energy minimum to the ground state in the hexagonal topology. The defect pair is stable up to temperatures of at least 300 C well above normal operating temperatures for long periods of time. Furthermore, the device is environmentally friendly, the only by-product being carbon atoms which are not converted to CO or $CO_2$.

The path to a viable energy storage device does not end with this realization. In addition we had to determine whether the energy density stored in the carbon nanostructures was or could be made high enough for practical application. And if theoretically possible, how to introduce SW defect pairs to achieve high energy storage density. Furthermore, once energy is stored in the Stone-Wales defect pairs we had to determine how to release the energy in a useful manner. Could the energy be released as electrical energy in a controlled manner for use as a battery? Could the energy be released in an uncontrolled manner for use as an explosive?

Figure 4:
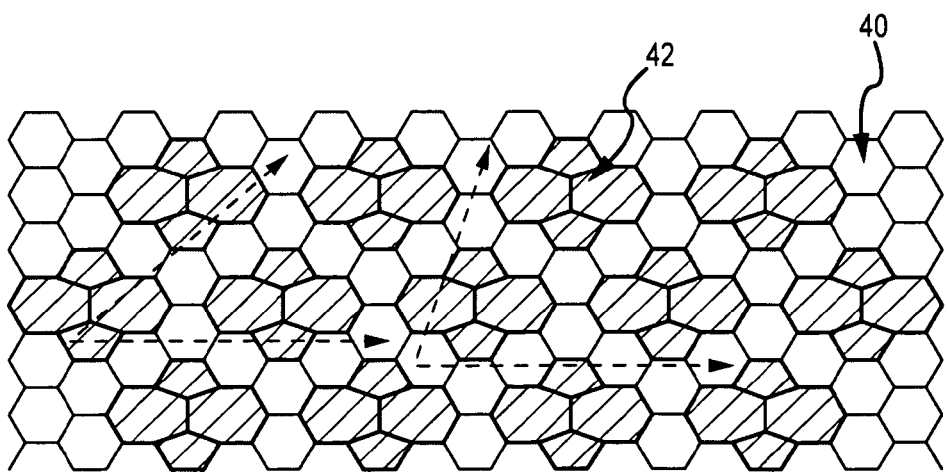
FIG. 4 is a diagram of a SWNT manufactured with a high density of SW defect pairs.

A SW defect density of 5% or less that naturally occurs in known manufacturing processes is insufficient in that both the energy density is too low to be useful and the defect density is too low to support stimulated annihilation of the defects to extract the stored energy. Therefore instead of treating the nanostructures to remove the SW defect pairs, we modify the initial manufacturing process or provide additional processing for carbon nanostructures 40 to increase the density of SW defect pairs 42 to at least a threshold of 25% and preferably at least 75% as shown in FIG. 4. A maximum packing of SW defect pairs requires a single atom separating pairs, which corresponds to a density of approximately 90%.

Calculations of energy density revealed surprisingly high energy concentrations considering each defect contributes only 10 eV. A density of approximately 25% provides an energy density comparable to that of a Lithium ion battery (≈0.5 Meg Joules/Kg). A density of approximately 75% provides an energy density comparable to that of TNT (≈4 Meg Joules/Kg). Other materials than carbon and other defects than Stone-Wales could in theory work but (a) other defects are not as stable as the Stone-Wales defect and (b) other materials provide much less energy in the bonds.

Figure 2:
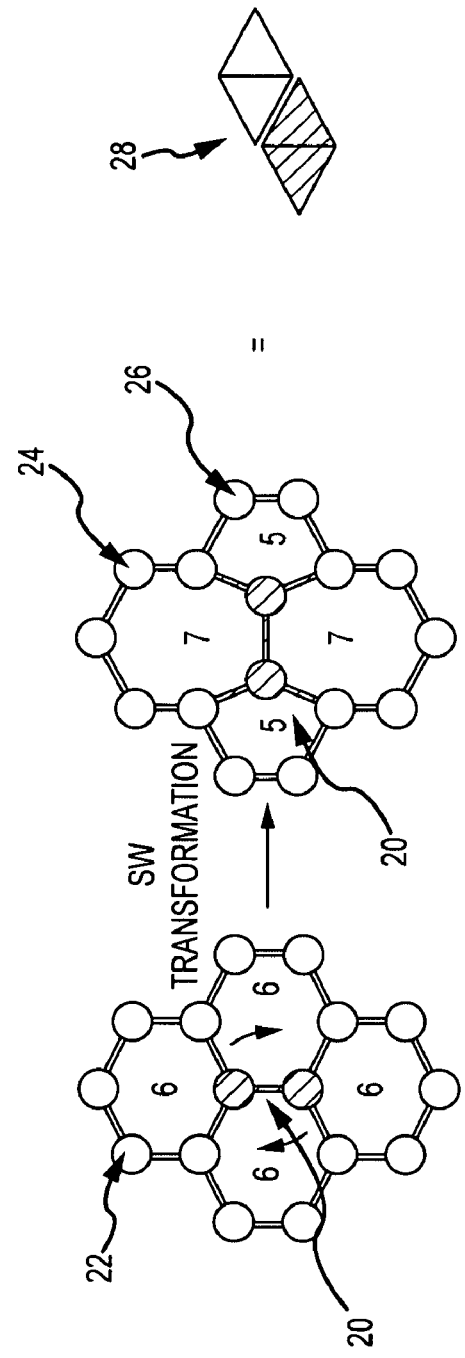
FIG. 2 is a diagram illustrating the transformation of a 6:6 carbon lattice to a pair of 5:3 Stone-Wale (SW) defects.

SW defect pairs are also unique because they can be generated by a carbon atom conserving topological transformation as shown in FIG. 2 that simply rotates a bond that links two carbon atoms in the grapheme lattice, while holding the two atoms along the line that is being rotated. SW defect pairs may be created by, for example, physical deformation of the carbon nanotubes (e.g. stretching or bending) or by irradiation with electrons, ions or even neutrons. Stretching carbon nanostructures at elevated temperatures, say 700 C+/−300 C, will introduce SW defect pairs. The structures are then cooled to lock-in the defects. Bending a nanostructure (CNT or graphene sheet) forms a line of SW defects pairs along the bend. Irradiation of the nanostructure with an electron, ion or neutron beam (including carbon or other atoms) may create SW defect pairs directly or produce simple hole defects that can be "annealed" to form SW defect pairs. Conventional electron and ion beams may be used to irradiate the structures. The structures may be placed in a nuclear reactor and used in place of the graphite moderate to slow down the neutron beam. As such, the creation of masses of carbon nanostructures with high-density Stone-Wales defect pairs is a byproduct of a conventional nuclear reactor. These procedures can be performed during the initial manufacturing process of the nanostructures or during subsequent process of nanostructures initial manufactured using convention techniques that produce SW defect densities of <5%.

Figure 5A:
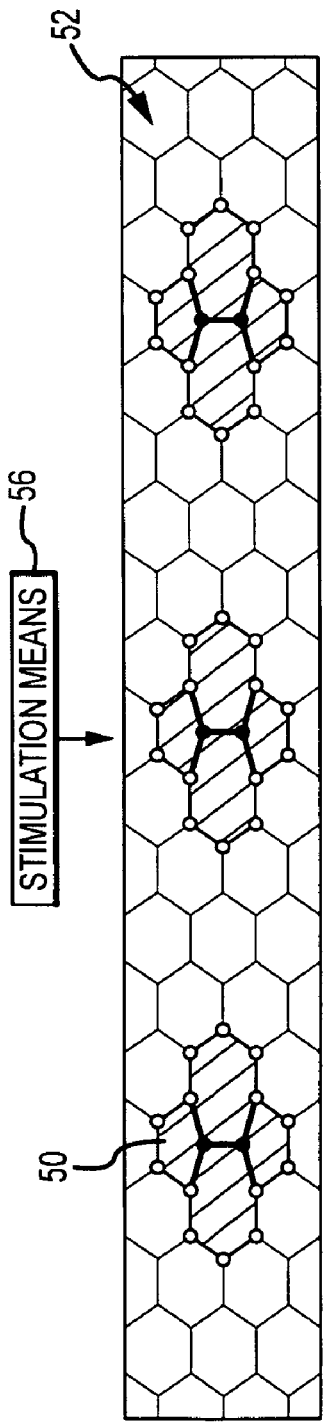
FIGS. 5a through 5c are diagrams illustrating the stimulation and annihilation of the SW defects to release energy in the form of lattice vibrations.
Figure 5B:
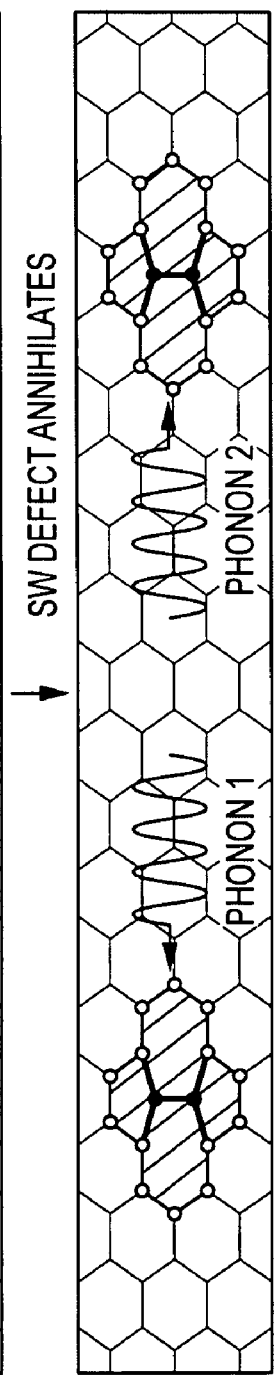
Figure 5C:
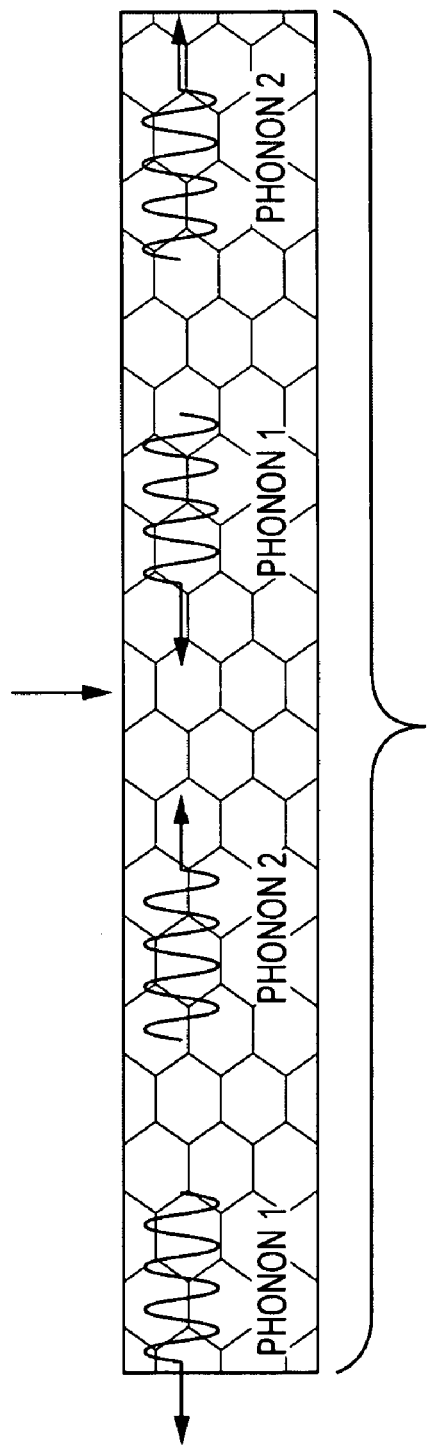

The mechanism for releasing the chemical energy in the form of lattice vibrations is illustrated in FIGS. 5a through 5c: The high concentration of Stone-Wales defect pairs 50 in a carbon nanostructure 52 creates an excited medium inside a nano-cavity 54 formed by the 2-D outer surface of the nanostructure. Stimulation means 56 (e.g. laser pulse, heat or stretching) stimulate enough Stone-Wales defect pairs 50 to overcome cavity losses to produce stimulated coherent emissions. Any mode of excitation that couples a little to the lattice vibration (phonon) will drain energy (loss) such as plasmon modes (coherent electron gas motion) or photon radiation modes in form of cavity losses. As each defect pair is annihilated, it generates two opposite traveling phonons, phonon 1 and phonon 2 due to lattice vibrations, thereby releasing the stored chemical energy as heat. The traveling phonons in turn annihilate other defect pairs producing a chain reaction. About 3 eV of energy is required to stimulate each SW defect pair to release about 10 eV of energy. The density (<5%) of SW defect pairs that naturally occurs in conventional manufacturing processes may be too low to provide an excited medium to sustain the chain reaction. Increasing the density is thus not only important to increase the energy density but also to release the stored energy.

Stimulation means 56 can be any mechanism that can stimulate the excited medium to annihilate enough Stone-Wales defect pairs to overcome cavity losses to produce stimulated coherent emissions. In an embodiment, the stimulation means includes a laser source that emits phonons at least some of which are of the correct frequency to stimulate the SW defect pairs. The quantum of lattice vibrations of the SW defect pair will determine the correct frequency. For example, a pulse laser will generate a lot of phonons at different frequencies at least some of which will stimulate a number of the Stone-Wales defect pairs. In another embodiment, a heat source heats the carbon nanostructures to a sufficiently high temperature that the Stone-Wales defect pairs return to the "ground state" of the hexagonal topology. In another embodiment, a mechanical source stretches or otherwise physically deforms the nanostructures in such a manner that the defects return to the ground state.

In most applications a mass of carbon nanostructures with Stone-Wales defect pairs will be used to release a useful amount of energy. Since the annihilation of each defect pair releases only 10 eV the total energy released for a single nanostructure is quite small. The mass may include millions to billions or more carbon nanostructures in a confined volume. A single means may be provided to stimulate all of the structures or multiple means provided to stimulate the structures at the same time or in accordance with a desired timing schedule.

Explosive

Figure 6:
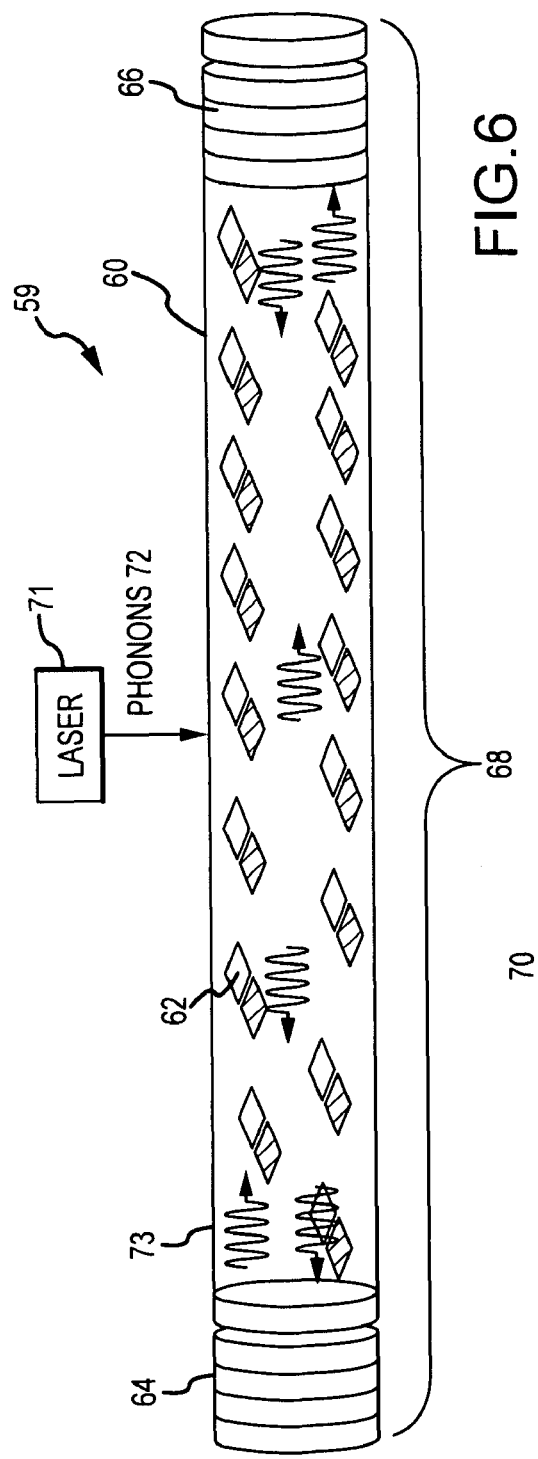
FIG. 6 is a diagram of an explosive nano-device.
Figure 7:
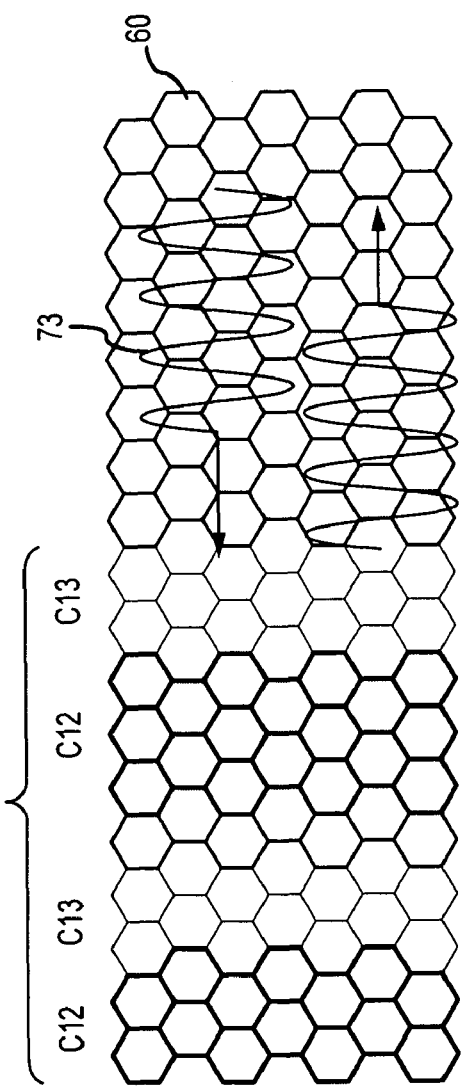
FIG. 7 is an embodiment of an isotope-junction for providing a reflector.

As shown in FIG. 6, an explosive 59 includes a carbon nanostructure 60 including a high density of Stone-Wales defect pairs 62. Reflectors 64 and 66 at opposite ends of the nanostructure form a resonant cavity 68. Each reflector may be formed simply by the interface of the end of the carbon nanostructure 60 with the external environment that provides an impedance mismatch. Alternately, the growth of the carbon nanostructure may be controlled to form isotope junctions 70 (e.g. C12:C13:C12:C13) in-situ that provide higher quality reflectors as shown in FIG. 7. A laser source 71 generates phonons 72 that stimulate some of the Stone-Wales defect pairs 62, which in turn release a pair of phonons 73 in opposite directions. These phonons reflect back-and-forth in the cavity. The chain reaction builds up rapidly in the resonant cavity to release all of the stored energy at once in a violent shockwave that breaks the stable carbon bonds to detonate.

Figure 8:
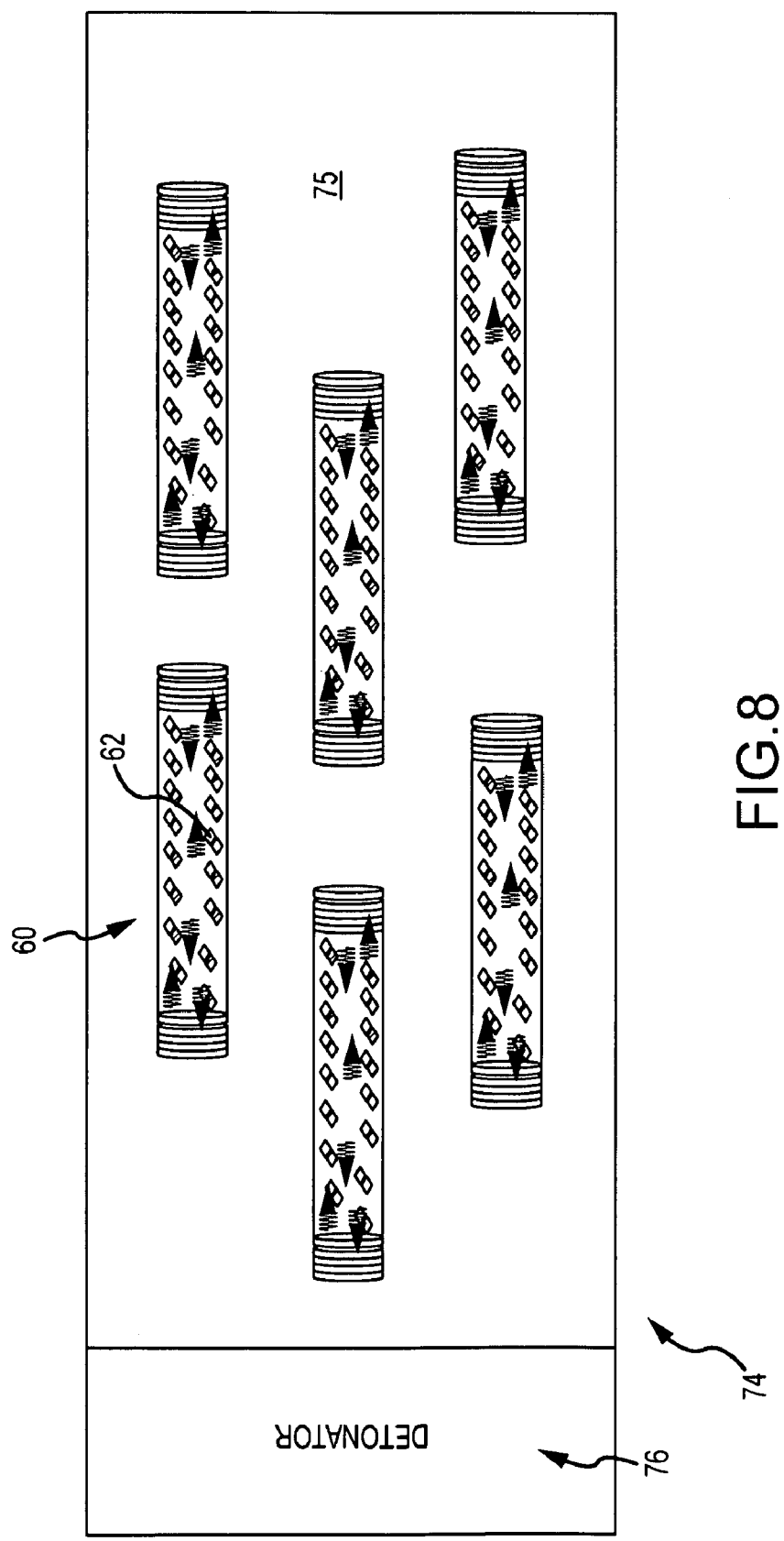
FIG. 8 is a diagram of an explosive device.

As shown in FIG. 8, an explosive 74 includes a mass of carbon nanostructures 60 including a high density of Stone-Wales defect pairs 62 in a resonant cavity. The structures are embedded in another medium 75 such as another high explosive or an inactive material. A detonator 76 such as a laser or conventional primary detonator stimulates the nanostructures 60 to cause them to detonate. If the medium is another explosive, the detonation of the nanostructures in turn causes that explosive to detonate.

This explosive may provide comparable energy densities of more traditional explosives while providing much improved temperature stability. The high temperature stability is also a measure of its stability against other perturbations such as mechanical shock, electrical discharge, and even explosions nearby. Explosives that are more stable, less prone to accidental detonation, are always of interest.

Battery

Figure 9:
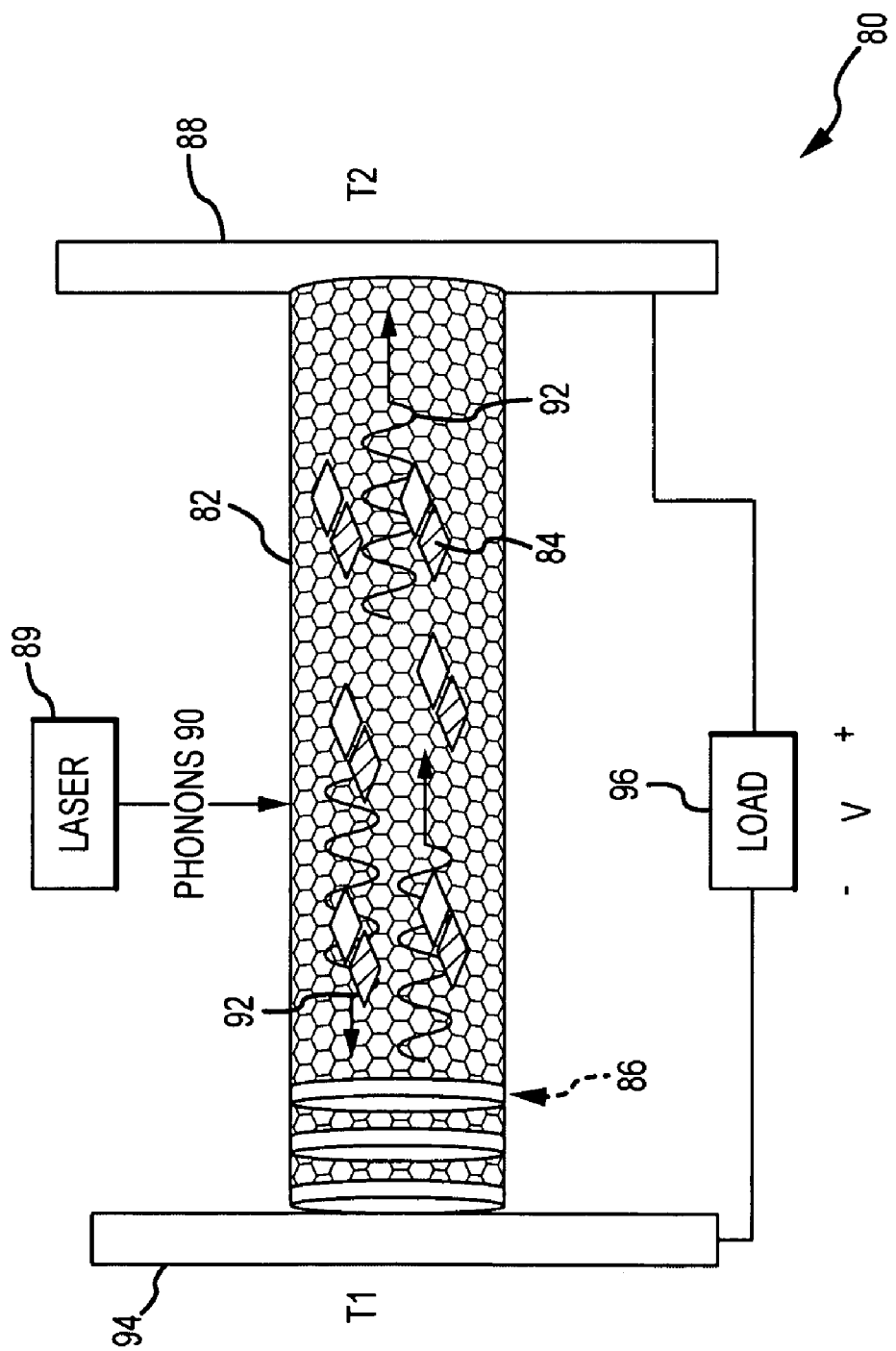
FIG. 9 is a diagram of a nano-battery.

As shown in FIG. 9, battery 80 includes carbon nanostructure 82 including a high density of Stone-Wales defect pairs 84. Heat reflector 86 and heat absorber 88 are positioned at opposite ends of the cavity. Again, heat reflector 86 may be an isotope junction as shown. Laser source 89 generates phonons 90 that stimulate some of the Stone-Wales defect pairs 84, which in turn release a pair of phonons 92 in opposite directions. Phonons travelling towards heat absorber 88 are absorbed. Phonons travelling towards heat reflector 86 are reflected and then absorbed. This produces a larger temperature differential at opposite ends of the cavity.

The Seebeck effect is used to convert the temperature differential across the cavity directly into electricity. The effect is that a voltage, the thermoelectric EMF, is created in the presence of a temperature difference between two different metals or semiconductors. A first metal "A" 94 is placed at the reflecting end of the cavity. The isotope junction could be removed and metal 94 could also act as the reflector. A second metal "B", which in this embodiment doubles as heat absorber 88, is at the absorbing end of the cavity. This causes a continuous' current to flow through the carbon nanostructures if they form a complete loop. A complete loop may be formed by connecting the battery across a load 96.

The voltage created by the battery across the load is of the order of several microvolts per Kelvin difference. In the circuit the voltage V developed is $$V = \int (SB(T) - SA(T)) dT \text{ for } T = T1 \text{ to } T2$$

where SA and SB are the Seebeck coefficients (also called thermoelectric power or thermopower) of the metals A and B as a function of temperature, and T1 and T2 are the temperatures of the two junctions. The Seebeck coefficients are nonlinear as a function of temperature, and depend on the conductors' absolute temperature, material, and molecular structure. If the Seebeck coefficients are effectively constant for the measured temperature range, the above formula can be approximated as: V=(SB−SA)×(T2−T1).

Figure 10:
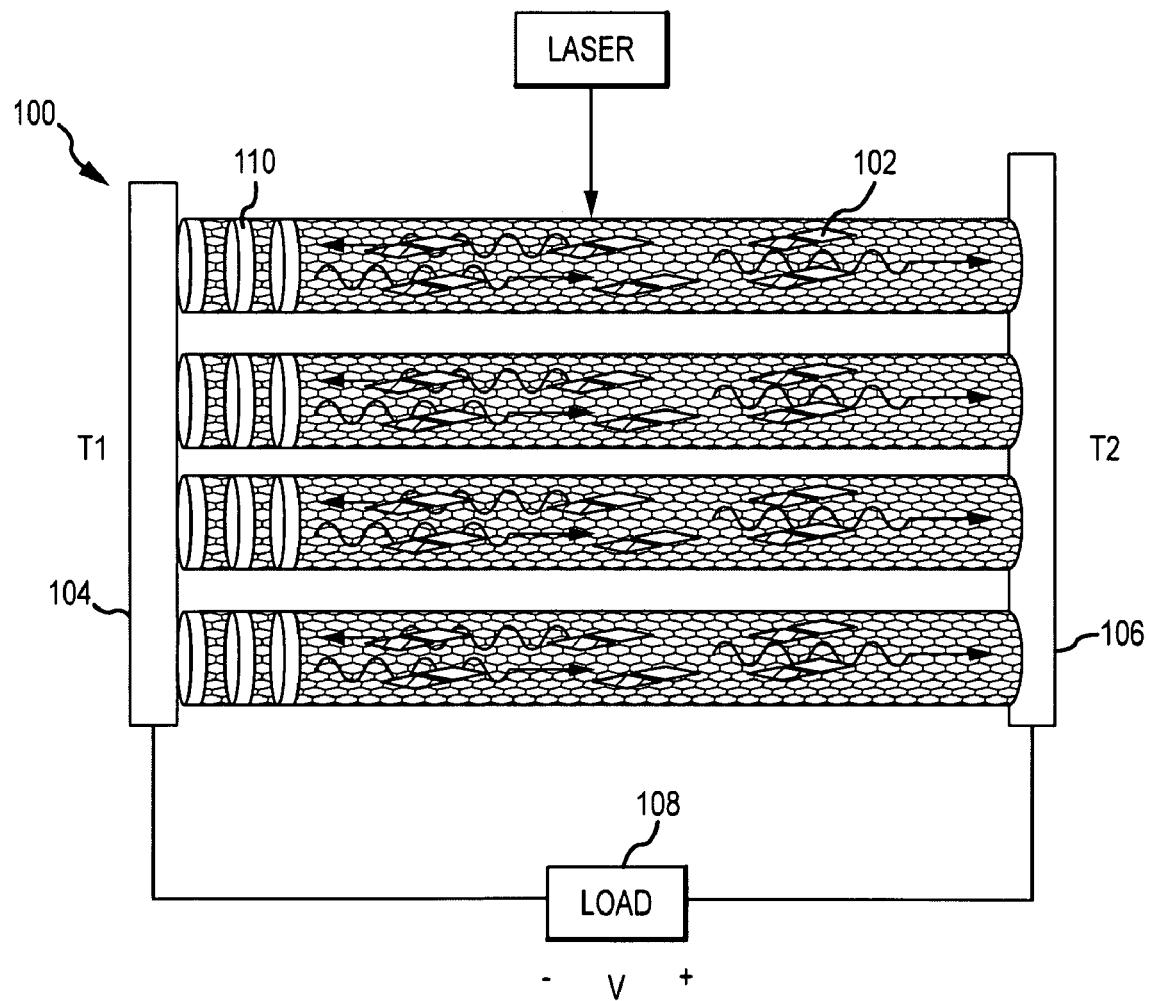
FIG. 10 is a diagram of a battery cell.

As shown in FIG. 10, a battery cell 100 includes a 2-D array of carbon nanostructures 102 including a high density of SW defect pairs arranged in parallel between a common metal electrode 104 at the reflecting end of the structure and a common metal electrode 106 at the absorbing end of the structure. The connection of many nanostructures in parallel increases the heat capacity to produce a voltage V across a load 108. In this embodiment, each nanostructure has its own isotope junction 110 that functions as the reflector. These junctions are in thermal contact with common metal electrode 104. Alternately, the common metal electrode could also function as a common reflector for all the structures. In this embodiment, common metal electrode 106 also functions as a common absorber for all of the structures. Alternately, each structure could have its own absorber, which would be in thermal contact with electrode 106. In the field of carbon nanotube growth, techniques are known for growing large numbers of CNTs between two parallel plates. This process can be modified to accommodate the present invention by forming one plate as a reflector and one plate as an absorber and either modifying the growth process to increase the density of SW defect pairs and/or post-processing the structures to increase the density.

A battery may include one or more independent "cells" each containing a single carbon nanostructure or a mass of carbon nanostructures with a high density of SW defects to generate electrical energy. The stimulation of each cell will produce a temperature differential and a pulse of electrical energy. Once all of the SW defect pairs are annihilated the temperature differential will subside. To produce a sequence of energy pulses or an approximately continuous energy source for some period of time, multiple cells can be stimulated in a time sequence. To produce a larger voltage, multiple cells may be connected in series. To source a larger current at a given voltage, multiple cells may be connected in parallel. A notable difference of the carbon nanostructure battery as compared to conventional chemical batteries is that the release of electrical energy is controlled by the source and stimulation of the SW defect pairs, not the connection of the load across the battery.

This battery provides high temperature stability not found in standard chemical batteries. Furthermore, the battery may be configured to provide energy storage densities several times that of standard chemical batteries.

Thermocouple

The Seebeck Effect forms the basis for thermocouples. A conductor generates a voltage when subjected to a temperature gradient. To measure this voltage, one must use a second conductor material which generates a different voltage under the same temperature gradient. Otherwise, if the same material was used for the measurement, the voltage generated by the measuring conductor would simply cancel that of the first conductor. The voltage difference generated by the two materials can then be measured and related to the corresponding temperature gradient. It is thus clear that, based on Seebeck's principle; thermocouples can only measure temperature differences and need a known reference temperature to yield the absolute readings. There are three major effects involved in a thermocouple circuit: the Seebeck, Peltier, and Thomson effects. The Seebeck effect describes the voltage or electromotive force (EMF) induced by the temperature difference (gradient) along the wire. The change in material EMF with respect to a change in temperature is called the Seebeck coefficient or thermoelectric sensitivity. This coefficient is usually a nonlinear function of temperature. Peltier effect describes the temperature difference generated by EMF and is the reverse of Seebeck effect. Finally, the Thomson effect relates the reversible thermal gradient and EMF in a homogeneous conductor.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A chemical energy storage device, comprising:
a carbon nanostructure including a density of Stone-Wales defect pairs that define an excited medium within a cavity that exhibits cavity losses;
first and second isotope junctions at opposite ends of the cavity to create the resonant cavity; and
means for coherently stimulating the excited medium to annihilate Stone-Wales defect pairs to emit phonons, said density of Stone-Wales defect pairs being greater than a threshold required to overcome cavity losses and initiate a chain reaction to annihilate substantially all of the defect pairs to release chemical energy.

2. A chemical energy storage device, comprising:
a resonant cavity that exhibits cavity losses;
an explosive medium in the resonant cavity;
a plurality of carbon nanostructures embedded in said explosive medium, said carbon nanostructures including a density of Stone-Wales defect pairs; and
means for coherently stimulating the excited medium to annihilate Stone-Wales defect pairs to emit phonons, said density of Stone-Wales defect pairs being greater than a threshold required to overcome cavity losses and initiate a chain reaction to annihilate substantially all of the defect pairs to release sufficient chemical energy to break the carbon-carbon bonds in the nanostructure to produce an explosive detonation that detonates the explosive medium.

3. A chemical energy storage device, comprising:
a carbon nanostructure including a density of Stone-Wales defect pairs that define an excited medium within a cavity that exhibits cavity losses;
a reflector at a first end of the cavity;
an absorber at a second end of the cavity;
means for coherently stimulating the excited medium to annihilate Stone-Wales defect pairs to emit phonons, said density of Stone-Wales defect pairs being greater than a threshold required to overcome cavity losses and initiate a chain reaction to annihilate substantially all of the defect pairs to release chemical energy;
whereby annihilation of the Stone-Wales defect pairs causes phonons to be reflected by the reflector at the first end of the cavity and absorbed by the absorber at the second end of the cavity to establish a thermal gradient across the cavity; and
means for converting the thermal gradient across the cavity into electrical energy.

4. The device of claim 3, wherein the reflector comprises an isotope junction.

5. The device of claim 3, wherein the means includes first and second metals at opposite ends of the cavity that exhibit different Seebeck coefficients.

6. The device of claim 5, wherein a plurality of carbon nanostructures are arranged in a parallel configuration between said first and second metals.

7. A chemical energy storage device, comprising:
a plurality of carbon nanostructures, each nanostructure including a density of Stone-Wales defect pairs of at least 25% that define an excited medium within a cavity that exhibits cavity losses;
a reflector at a first end of the cavity and
an absorber at a second end of the cavity;
stimulation means for coherently stimulating the excited medium to annihilate Stone-Wales defect pairs to emit phonons, said density of Stone-Wales defect pairs being greater than a threshold required to overcome cavity losses and initiate a chain reaction to annihilate substantially all of the defect pairs to release chemical energy, said emitted phonons reflected by the reflector at the first end of the cavity and absorbed by the absorber at the second end of the cavity to establish a thermal gradient across the cavity; and
means for converting the thermal gradient across the parallel configured carbon nanostructures into electrical energy.

8. The device of claim 7, wherein the means comprises two different metals thermally coupled to the reflector and absorber at opposite ends of the cavity that exhibit different Seebeck coefficients.

9. The device of claim 8, wherein the second metal provides the absorber at the second end of the cavity for each said nanostructure and wherein each nanostructure has its own reflector at the first end of the cavity in thermal contact with the first metal.

10. The device of claim 7, wherein the density of Stone-Wales defect pairs is at least 75%.

11. The device of claim 7, further comprising a plurality of cells, each cell including a cavity with a reflector and an absorber at opposite ends with a plurality of carbon nanostructures including a density of Stone-Wales defects there between, said stimulation means adapted to stimulate each said cell independently.

12. The device of claim 7, wherein said means for stimulating the excited medium comprises a laser, a heater or means of physically deforming the carbon nanostructure.

13. A chemical energy storage device, where comprising:
a solid medium comprising an explosive;
a mass of carbon nanostructures embedded in said solid medium, each said nanostructure including a density of Stone-Wales defect pairs of at least 25% within a resonant cavity; and
means for stimulating the Stone-Wales defect pairs to detonate the carbon nanostructures to detonate the explosive.

14. A chemical energy storage device, comprising:
a plurality of carbon nanostructures, each nanostructure including a density of Stone-Wales defect pairs that define an excited medium within a cavity that exhibits cavity losses;
a reflector at a first end of the cavity;
an absorber at a second end of the cavity;
stimulation means for coherently stimulating the excited medium to annihilate Stone-Wales defect pairs to emit phonons that are reflected by the reflector at the first end of the cavity and absorbed by the absorber at the second end of the cavity to establish a thermal gradient across the cavity; and
means for converting the thermal gradient into electrical energy.

15. A chemical energy storage device, comprising:
a solid explosive;
a mass of carbon nanostructures embedded in said solid explosive, each said nanostructure including a density of Stone-Wales defect pairs; and
means for stimulating the Stone-Wales defect pairs to detonate the carbon nanostructures to detonate the solid explosive.

16. The device of claim 15, wherein said carbon nanostructures comprise carbon nanotubes (CNTs).

17. The device of claim 15, wherein said carbon nanostructures comprise graphene sheets.

18. The device of claim 15, wherein the density of Stone-Wales defect pairs is at least 25%.

19. The device of claim 15, wherein the density of Stone-Wales defect pairs is at least 75%.

20. The device of claim 15, wherein the means for stimulating the excited medium comprises a laser, a heater or means of physically deforming the carbon nanostructure.

21. The device of claim 15, wherein the mass of carbon nanostructures are within a resonant cavity.

22. The device of claim 21, wherein the annihilation of the Stone-Wales defect pairs in the chain reaction inside the resonant cavity releases sufficient energy to break the carbon-carbon bonds in the nanostructure to produce an explosive detonation.

23. The device of claim 22, further comprising a plurality of said carbon nanostructures that are coherently stimulating to produce the explosive detonation.

24. The device of claim 15, wherein the mass of carbon nanostructures excited medium is stable at temperatures of no less than 300 degrees C. until stimulated.

\* \* \* \* \*

UNITED STATES PATENT AND TRADEMARK OFFICE
CERTIFICATE OF CORRECTION

PATENT NO. : 7,837,813 B1  
APPLICATION NO. : 12/473274  
DATED : November 23, 2010  
INVENTOR(S) : Delmar L. Barker et al.

Page 1 of 1

It is certified that error appears in the above-identified patent and that said Letters Patent is hereby corrected as shown below:

IN THE CLAIMS:

In column 9, claim 13, line 41, before the word "comprising" delete "where"

Signed and Sealed this
Twenty-third Day of August, 2011

David J. Kappos
*Director of the United States Patent and Trademark Office*